US008945391B2

(12) United States Patent
Ichinose et al.

(10) Patent No.: US 8,945,391 B2
(45) Date of Patent: Feb. 3, 2015

(54) ORGANIC POLYMERS-SEPARATION MEMBRANE FILTER, AND ORGANIC POLYMERS-SEPARATION METHOD

(75) Inventors: Izumi Ichinose, Tsukuba (JP); XinSheng Peng, Tsukuba (JP)

(73) Assignee: National Institute for Materials Science, Tsukuba-shi, Ibaraki (JP)

( * ) Notice: Subject to any disclaimer, the term of this patent is extended or adjusted under 35 U.S.C. 154(b) by 641 days.

(21) Appl. No.: 13/261,013

(22) PCT Filed: Apr. 26, 2010

(86) PCT No.: PCT/JP2010/057364
§ 371 (c)(1),
(2), (4) Date: Nov. 15, 2011

(87) PCT Pub. No.: WO2011/016274
PCT Pub. Date: Feb. 10, 2011

(65) Prior Publication Data
US 2012/0055877 A1 Mar. 8, 2012

(30) Foreign Application Priority Data

Aug. 3, 2009 (JP) .................................. 2009-180267

(51) Int. Cl.
*B01D 61/00* (2006.01)
*B01D 39/00* (2006.01)
(Continued)

(52) U.S. Cl.
CPC .............. *B01D 61/145* (2013.01); *B01D 69/02* (2013.01); *B01D 69/144* (2013.01); *B01D 71/74* (2013.01); *B82Y 30/00* (2013.01); *B01D 2323/30* (2013.01)
USPC .................. 210/651; 210/500.27; 210/500.22; 424/489

(58) Field of Classification Search
CPC ............. B01D 61/145; B01D 2323/28; B01D 2323/36; B01D 71/06; C02F 1/444; C04B 38/00; C04B 38/0054
USPC ............... 210/650, 638, 490, 500.27, 500.22, 210/651; 424/489
See application file for complete search history.

(56) References Cited

U.S. PATENT DOCUMENTS 4,752,395 A * 6/1988 Sleytr et al. ................... 210/490
4,849,109 A * 7/1989 Sleytr et al. ................... 210/650
(Continued)

FOREIGN PATENT DOCUMENTS

JP       2004-262692     9/2004
JP       2009-233540    10/2009
WO    WO 2009/008556    1/2009

OTHER PUBLICATIONS

JACS Articles Published on Web Jun. 15, 2007; General Method for Ultrathin Free-Standing Films of Nanofibrous Composite Materials; XinSheng Peng, Jian Jin, Emma M. Ericsson, and Izumi Ichinose; 8625 to 8633.

*Primary Examiner* — Ana Fortuna
(74) *Attorney, Agent, or Firm* — Manabu Kanesaka

(57) ABSTRACT

The object of the invention is to provide an organic polymers-separation membrane filter capable of physically separating organic polymers based on their molecular stereostructure difference without giving rise to chemical changes in them and without selecting their chemical compositions. The organic polymers-separation membrane filter comprising an ultrafilter membrane is characterized in that a path taken by a nano permeation pore has a narrower path portion having a width narrower than that of the rest, wherein organic polymers capable of changing in their stereostructure are passed through the path while their width is transformed into a configuration along the narrower path portion, thereby separating the organic polymers. In the ultrafilter membrane, particulate materials are mutually coupled together in its thickness and planar directions. The particulate materials comprise a protein. The particulate materials comprise protein particles deposited onto a nanostrand such that they are mutually crosslinked and integrated together. The nano permeation pore includes a mark remaining where the nanostrand is removed. The invention also provides a method for separating organic polymers capable of changing in their stereostructure, using the organic polymers-separation membrane filter.

4 Claims, 4 Drawing Sheets

(51) Int. Cl.
*B01D 39/14* (2006.01)
*A61K 9/14* (2006.01)
*B01D 61/14* (2006.01)
*B01D 69/02* (2006.01)
*B01D 69/14* (2006.01)
*B01D 71/74* (2006.01)
*B82Y 30/00* (2011.01)

(56) References Cited

U.S. PATENT DOCUMENTS 5,028,335 A * 7/1991 Sleytr et al. .................. 210/638
5,358,722 A * 10/1994 Monzyk ........................ 424/489
6,295,986 B1 * 10/2001 Patel et al. ................ 128/203.12
7,825,070 B2 * 11/2010 Matsui et al. .................. 506/32

* cited by examiner mono-6-O-(p-toluenesulfonyl)-γ-cyclodextrin

ORGANIC POLYMERS-SEPARATION MEMBRANE FILTER, AND ORGANIC POLYMERS-SEPARATION METHOD

RELATED APPLICATIONS

The present application is National Phase of International Application No. PCT/JP2010/057364 filed Apr. 26, 2010, and claims priority from Japanese Application No. 2009-180267, filed Aug. 3, 2009.

FIELD OF THE INVENTION

The present invention relates to an organic polymers-separation membrane filter capable of separating organic polymers based on their molecular stereostructure difference, and an organic polymers-separation method.

DESCRIPTION OF THE PRIOR ART

So for, the permeability of a permeation type filter for organic polymers has been determined on fractionated molecular weight (generally referring to the molecular weight of a solute at which the block rate becomes 90% and used as an index to the separation performance of a membrane). And, even with a filter relying upon an ultrafilter membrane, the separation of organic polymers is still recognized as taking place depending on their molecular weight magnitude, based on such general conception.

Therefore, the separation of organic polymers based on their stereostructure difference is considered impossible with such a permeation type filter; so they are still sorted out by another chemical treatment. However, not only is there a risk of incurring the deterioration or breakdown of the organic polymers to be separated, but it is also impossible to sort out them without discrimination; there are still a lot of organic polymers that cannot be sorted out.

Apart from that, the inventors have revealed that some free-standing protein porous films or membranes can separate molecules depending on their magnitude, as set forth in Patent Publication 1.

Patent Publication 1 teaches that by using a porous free-standing film as thin as 100 nm or less that is amassed by assembling proteins (such as ferritin) in water into a fibrous form using nanostrands of 2 nm in width (see Patent Publication 2), filtering the fibrous mass, crosslinking the proteins, and removing the nano-strands, molecules are filtrated and separated based on their nanolevel size difference; that is, they can be permeated and separated based on their molecular weight magnitude (see Patent Publication 1). It has also shown that pH differences result in a change in the molecular weight to permeate. However, none of Patent Publications 1 and 2 teach the separation of organic polymers based on their stereostructure difference.

Non-Patent Publication 1 shows that a free-standing ultrathin film (ultrafilter membrane) is prepared just only from organic polymers such as proteins but also from metallic or organic nanoparticles, but says nothing about the separation of organic polymers by an ultra-filter membrane based on their stereostructure difference.

LISTING OF THE PRIOR ARTS

Patent Publications

Patent Publication 1: WO2009008556
Patent Publication 2: JP(A) 2004-262692

Non-Patent Publication

Non-Patent Publication 1: Peng. et al., Journal of the American Chemical Society, Vol. 120, pp. 8625-8633, 2007, "General Method for ultrathin Free-Standing Films of Nanofibrous Composite Materials"

SUMMARY OF THE INVENTION

Object of the Invention

The situations being like this, the present invention has for its object to provide an organic polymers-separation membrane filter and an organic polymers-separation method, which enable organic polymers to be physically separated based on their stereostructure difference without giving rise to chemical changes in those polymers regardless of their chemical composition.

Means for Achieving the Object

The first aspect of the invention provides an organic polymers-separation membrane filter comprising an ultrafilter membrane, characterized in that a path taken by a nano permeation pore has a narrower portion having a width narrower than that of the rest, and organic polymers capable of changing in their stereostructure pass through the path taken by the nano permeation pore while the widths of the organic polymers are transformed into a configuration along the narrower portion, thereby separating the organic polymers.

In the second aspect of the invention, the organic polymers-separation membrane filter according to the first aspect is further characterized in that the ultrafilter membrane has particulate materials mutually coupled together in its thickness and planar directions, and the nano permeation pore is defined by a gap between the particulate materials.

In the third aspect of the invention, the organic polymers-separation membrane filter according to the second aspect is further characterized in that the particulate materials comprise a protein.

In the fourth aspect of the invention, the organic polymers-separation membrane filter according to the third aspect is further characterized in that the particulate materials are formed of protein particles deposited onto a nanostrand such that they are mutually crosslinked and integrated together, and the nano permeation pore includes a mark remaining where the nanostrand was removed.

In the fifth aspect of the invention, the organic polymers-separation membrane filter according to any one of the first to fourth aspects of the invention is further characterized in that the narrower portion is 0.5 nm to 20 nm inclusive in width.

The sixth aspect of the invention provides an organic polymers-separation method, characterized in that using an organic polymers-separation membrane filter comprising an ultrafilter membrane in which a path taken by a nano permeation pore has a narrower portion having a width narrower than that of the rest, organic polymers capable of changing in their stereostructure path through the path taken by the nano permeation pore while the widths of the organic polymers are transformed into a configuration along the shape of the narrower portion, thereby separating the organic polymers.

In the seventh aspect of the invention, the organic polymers-separation method according to the sixth aspect is further characterized in that organic polymers having a stereostructure having a polymer chain whose width exceeds the width of the narrower portion pass through the path taken by the nano permeation pore while the width of the polymer chain is reduced by conformational changes down to less than the width of the narrower portion.

The eighth aspect of the invention provides an organic polymers-separation method, in which, with a pressure difference of 20 kPa or more set between one surface side and another surface side of a filter, a solution having organic polymers dispersed therein passes through the filter, and which is characterized by using an organic polymers-separation membrane filter comprising an ultrafilter membrane in which a path taken by a nano permeation pore has a narrower portion having a width narrower than that of the rest, and dispersing in the solution an organic compound capable of being included in the organic polymers.

Advantages of the Invention

According to the invention, it has now been found that in the ultrafilter membrane, if the path taken by the nano permeation pore has a narrower portion having a width narrower than that of the rest (hereinafter called the narrower path portion), filtration and separation can then take place depending on whether or not the organic polymers have a stereostructure transformable along that "narrower path portion".

This finding underlies the invention: organic polymers can be selected by filtration based on their stereostructure difference, especially their conformational change, depending on whether or not the stereostructure is transformable along the "narrower path portion", which has been considered impossible so far in the art.

This enables organic polymers to be selected based on their stereostructure difference, rather than their molecular weight difference; in other words, they can be separated based on their stereostructure without causing chemical damage to their molecular structure yet regardless of the chemical components of their molecules.

EMBODIMENTS FOR CARRYING OUT THE INVENTION

Figure 1:
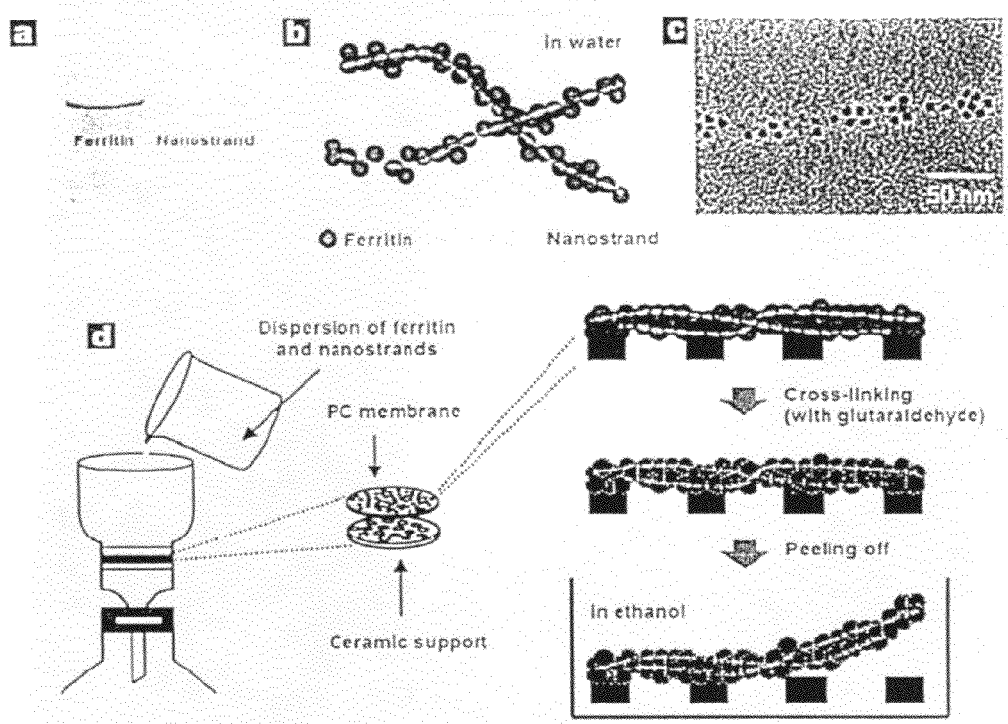
FIG. 1 is illustrative of the fabrication process for the ultra filter membrane capable of separating molecules based on their stereostructure.

The first feature of the organic polymers-separation membrane filter disclosed herein is that it comprises an ultrafilter membrane, and the nano permeation pore in that ultrafilter membrane is formed in a gap where three particulate materials are in contact, in which gap there is the "narrower path portion" formed that is of a constant size and length.

If the "narrower path portion" is capable of keeping a constant shape irrespective of whether the matter to be filtrated is particulate or fibrous, whether or not the matter can pas through the "narrower path portion" will be determined by the magnitude of its molecular weight regardless of its presence or absence.

Given the matter whose stereostructure changes by conformational changes, resulting in the ability to be transformed in its outer configuration, however, it can permeate through the "narrower path portion" even when its molecular weight is thigh: this finding underlies the invention.

As shown typically in the examples, sodium polystyrenesulfonate having a molecular weight of 70,000 was flexibly transformed by conformational changes into a configuration in which the width of the organic polymer was along the "narrower path portion"; so it could permeate through the membrane.

However, protoporphyrin having a molecular weight of 562.7, because of lack of such flexibility, could not permeate through the membrane, although its molecular weight was much lower than that of the sodium polystyrenesulfonate.

A possible reason for such a phenomenon could be that upon taking the path taken by the nano permeation pore, the organic polymer expands in such a way as to permit its width to be conformity to that of a wider path portion so that the organic polymer entering the narrower path portion can diminish in size corresponding to that width.

In the examples given below, the "narrower path portion" having its width set at 1.5 nm (hereinafter called the "narrow portion's width" is exemplified so as to separate organic polymers having a chain width of 1.5 nm (the dimension of the minor axis side of an organic polymer having a large aspect ratio); however, that width is variable by the as-formed adjustment of the ultrafilter membrane; so organic polymers with varying critical widths (that make their passage through the narrower path portion" impossible can be separated depending on the presence or absence of conformation.

Referring here to cases where there are organic polymers having similar conformation yet different critical widths, it is of course possible to use a plurality of filters comprising ultra filter membranes having different "narrower portion's widths" for the purpose of separating organic polymers having different chain widths. Further, even elongate molecules cannot be blocked by the membrane or membranes, provided that they are configured in such a way as to pass through the "narrower path portion".

It is here to be noted that organic polymers capable of such conformational changes are generally recognized as flexible organic polymers.

In the examples given later, each or the ultrafilter membrane may be thinned to 30 to 100 nm with a porosity of as high as 27%, and only the "narrower path portion" works mainly as viscous resistance to liquids. This then enables organic polymers to be concentrated at a flux at least 1,000 times as high as that achieved with a commercial available ultra filter membrane.

The membrane is so thin and so smooth that there is no clogging or jamming, and the concentration of the organic polymers on the feed side increases with filtration time.

Liquids permeate according to the Hagen-Poiseuille equation; that is, the flux is proportional to pressure differences, and inversely proportional to membrane thicknesses and liquids' viscosities.

On the other hand, Patent Publication 1 reveals that the pore diameter of ultrafilter membrane changes with pH; for instance, the pore diameter increases 5% at pH 13, and decreases 5% at pH 2.0.

From the examples given later, it has thus been found that even with the same ultra filter membrane, pH adjustment can be implemented thereby separating organic polymers based on their chain width difference.

It is here to be noted that when the ultrafilter membrane is short of strength or rich in flexibility, it may have to be held in place by a porous substance so as to keep its shape stable, but when an ultrafilter membrane free from such a requirement is used, the porous substrate is not always necessary.

In the examples, ultrafilter membranes comprising crosslinked spherical protein particles, especially spherical ferritin particles are exemplified. In the context of forming the "narrower path portion" with spherical substances, however, ultrafilter membranes having the advantages of the invention could be formed even with nanoparticles of metals, inorganic materials or other organic polymers, as taught by Non-Patent Publication 1.

It follows that given ultrafilter membranes having the "narrow portion's width" of up to 20 nm, preferably up to 10 nm, the invention is achievable.

General organic polymer size is 10 nm or less, and if the "narrower portion's width" is by far greater than 20 nm, the organic polymers get more flexible because of failing to keep their most stable conformation (their shape). Under such conditions, the "narrower path portion" according to the invention is not effective for to the separation of organic polymers.

The "narrower path portion" being less than 0.5 nm practically makes no sense, because there are none of such organic polymers as bringing about conformation enough to pass through the "narrower path portion".

Example 1

Examples of the ultrafilter membrane comprising proteins are given below.

Under the conditions set out in Table 1, an 4 mM cadmium nitrate aqueous solution (CN) and a 0.8 mM aminoethanol aqueous solution (EA) were quickly mixed together at room temperature in the amounts set out in Table 1, and the mixture was allowed to stand alone for the times shown in Table 1 to prepare an aqueous solution (Ns) of cadmium hydroxide nanostrands. An aqueous solution (Ft) of ferritin at a concentration of 3.8 mg/mL was added to, and stirred with, the solution (Ns) for the stirring times shown in Table 1.

In the ensuing light brown, transparent aqueous solution, there are nano composite fibers (Ns-Ft) formed that comprise ferritin and nanostrands. This aqueous solution was filtrated through a polycarbonate membrane filter having 0.2 μm pores in the amounts shown in Table 1. Over the filter there was an unwoven fabric of the nano composite fibers (Ns-Ft) formed. This unwoven fabric could have a thickness adjusted between 30 nm and 4 μm by selecting the volume (amount) of the aqueous solution to be filtrated.

After that, a membrane filter including an unwoven fabric of nano composite fibers having a nanometer-scaled thickness was brought in contact with a 10% glutaraldehyde aqueous solution (GA) for the times shown in Table 1, thereby crosslinking ferritin forming the unwoven fabric. Subsequently, the membrane filter was immersed in ethanol to peel the crosslinked unwoven fabric off it. Then, the membrane unwoven fabric was immersed in a 10 mM hydrochloric acid aqueous solution (Hc) for the times shown in Table 1 for elution of the nanostrands followed by water washing. Through such a process, there was a pinhole-free ultrafilter membrane formed. The operation as mentioned above is schematically shown in FIG. 1.

Figure 2:
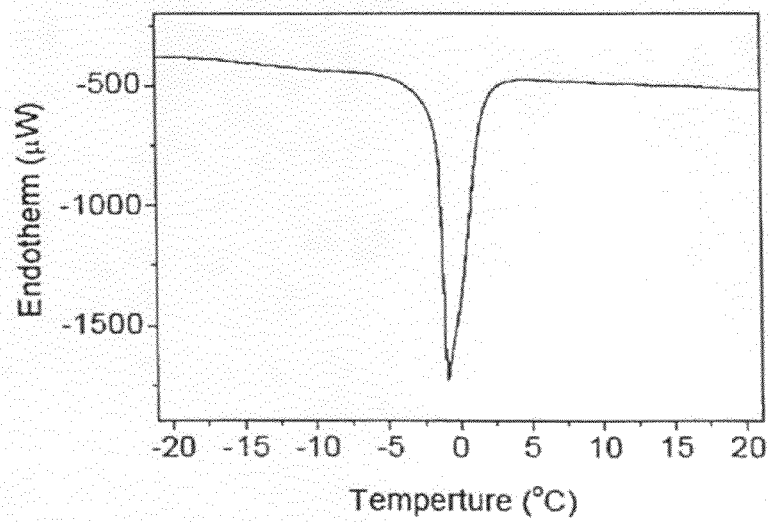
FIG. 2 is illustrative of a differential scanning calorimeter (DSC) thermogram for a water-containing ultrafilter membrane.

The ultrafilter membrane prepared by the above process is a porous membrane. In this ultrafilter membrane, the ferritin particles are mutually coupled together in its thickness and planar directions, and the gaps between the ferritin particles define nano permeation pores. Each or the nano permeation pore includes a mark remaining where the nano strand was removed. To confirm the porosity, a crosslinked ferritin membrane impregnated with plenty of water was measured on a differential scanning calorimeter. In the heating process, an endothermic peak based on the melting of the contained water at a temperature of −0.8° C. was observed as shown in FIG. 2. The water content of each ultrafilter membrane was estimated from enthalpy changes at that peak. Note here that FIG. 2 shows endothermic peaks in RNos. 1 to 14. The water content was estimated to be 27 wt %.

And the fact that this ultrafilter membrane has nano permeation pores having the widths shown in Table 1 and almost all of them have the same "narrower portion's width" was confirmed from the block rates of dye molecules and cyclodextrin derivatives.

TABLE 1

| | Formation of Ns | | | Formation of Ns-Ft | | | Formation of UF | |
|---|---|---|---|---|---|---|---|---|
| RNo. | CN mL | EA mL | Stirring min. | Ns mL | Ft mL | Stirring min. | Amount mL/cm$^2$ | Thickness nm |
| 1-01 | 20 | 20 | 10 | 20 | 1 | 30 | 0.033 | 30 |
| 1-02 | 20 | 20 | 10 | 20 | 1 | 30 | 0.066 | 60 |
| 1-03 | 20 | 20 | 10 | 20 | 1 | 30 | 0.088 | 80 |
| 1-04 | 20 | 20 | 10 | 20 | 1 | 30 | 0.110 | 100 |
| 1-05 | 20 | 20 | 10 | 20 | 1 | 30 | 0.132 | 120 |
| 1-06 | 20 | 20 | 10 | 20 | 1 | 30 | 0.165 | 150 |
| 1-07 | 20 | 20 | 10 | 20 | 1 | 30 | 0.220 | 200 |
| 1-08 | 20 | 20 | 10 | 20 | 1 | 30 | 0.308 | 280 |
| 1-09 | 20 | 20 | 10 | 20 | 1 | 30 | 0.352 | 320 |
| 1-10 | 20 | 20 | 10 | 20 | 1 | 30 | 0.440 | 400 |
| 1-11 | 20 | 20 | 10 | 20 | 1 | 30 | 0.528 | 480 |
| 1-12 | 20 | 20 | 10 | 20 | 1 | 30 | 0.661 | 600 |
| 1-13 | 20 | 20 | 10 | 20 | 1 | 30 | 1.707 | 1,550 |
| 1-14 | 20 | 20 | 10 | 20 | 1 | 30 | 4.405 | 4,000 |

| | Final Adjustment | | | Ultrafilter Membrane Nano Permeation Pore | |
|---|---|---|---|---|---|
| RNo. | Ga hr | Hc hr | Thickness nm | Narrower Width nm | Max. Width nm |
| 1-01 | 1 | 1 | 30 | 1.7-2.2 | 4.5-5.0 |
| 1-02 | 1 | 1 | 60 | 1.7-2.2 | 4.5-5.0 |
| 1-03 | 1 | 1 | 80 | 1.7-2.2 | 4.5-5.0 |
| 1-04 | 1 | 1 | 100 | 1.7-2.2 | 4.5-5.0 |
| 1-05 | 1 | 1 | 120 | 1.7-2.2 | 4.5-5.0 |
| 1-06 | 1 | 1 | 150 | 1.7-2.2 | 4.5-5.0 |
| 1-07 | 1.5 | 1 | 200 | 1.7-2.2 | 4.5-5.0 |
| 1-08 | 1.5 | 1 | 280 | 1.7-2.2 | 4.5-5.0 |
| 1-09 | 1.5 | 1 | 320 | 1.7-2.2 | 4.5-5.0 |
| 1-10 | 2 | 1 | 400 | 1.7-2.2 | 4.5-5.0 |
| 1-11 | 2 | 1 | 480 | 1.7-2.2 | 4.5-5.0 |
| 1-12 | 2 | 1 | 600 | 1.7-2.2 | 4.5-5.0 |
| 1-13 | 3 | 1 | 1,550 | 1.7-2.2 | 4.5-5.0 |
| 1-14 | 3 | 1 | 4,000 | 1.7-2.2 | 4.5-5.0 |

UN: Unwoven fabric
CN: 4 mM Cadmium nitrate aqueous solution
Ns-Ft: Ns/Ft nano composite fiber
EA: 0.8 mM Aminoethanol aqueous solution
Ga: Contact time with 10% glutaraldehyde aqueous solution
Ns: Aqueous solution of cadmium hydroxide nanostrands
Hc: Contact time with 10 mM hydrochloric acid aqueous solution
Ft: Ferritin aqueous solution at 3.8 mg/mL concentration The ultrafilter membrane fabricated by the above process, because of being rich in flexibility, was assembled with an associated supporting substrate into a filter. The support (substrate) used here includes, without limitation, the polycarbonate membrane filter having 0.2 μm pores (with a porosity of 10%) as already mentioned, and an anodized porous alumina filter having 0.2 μm pores (with a porosity of 50%).

The permeation rate of an ultrafilter membrane may be normalized in terms of the effective area of a porous substrate (substrate area×porosity). In other words, the permeation rate of the ultrafilter membrane over a porous alumina filter with a porosity of 50% is five times as high as that over a membrane filter with a porosity of 10%. In what follows, the ultrafilter membrane will thus be estimated and calculated in terms of the effective area of the substrate.

TABLE 2

| FNo. | Material | Substrate Thickness μm | Permeation Area mm² | Porosity % | RNo. |
|---|---|---|---|---|---|
| 2-01 | Mf | 10 | 227 | 10 | 1-01, 1-02, 1-03, 1-04, 1-05, 1-06, 1-07, 1-08, 1-09, 1-10, 1-11, 1-12 1-13, 1-14 |
| 2-02 | Mf | 10 | 1,735 | 10 | 1-02, 1-03, 1-04, 1-05, 1-06, 1-07, 1-08, 1-09, 1-10, 1-11, 1-12, 1-13 1-14 |
| 2-03 | Mf | 10 | 4,412 | 10 | 1-02, 1-03, 1-04, 1-05, 1-06, 1-07, 1-08, 1-09, 1-10, 1-11, 1-12, 1-13 1-14 |
| 2-04 | Af | 60 | 227 | 50 | 1-01, 1-02, 1-03, 1-04, 1-05, 1-06, 1-07, 1-08, 1-09, 1-10, 1-11, 1-12 1-13, 1-14 |

TABLE 2-continued

| FNo. | Material | Substrate Thickness μm | Permeation Area mm² | Porosity % | RNo. |
|---|---|---|---|---|---|
| 2-05 | Af | 60 | 1,735 | 50 | 1-04, 1-05, 1-06, 1-07, 1-08, 1-09, 1-10, 1-11, 1-12, 1-13, 1-14 |

Mf: Polycarbonate membrane filter having 0.2 μm pores
Af: Anodized porous alumina filter having 0.2 μm pores
RNo.: Membrane filter No. in Table 1 (RNo.)

Figure 3:
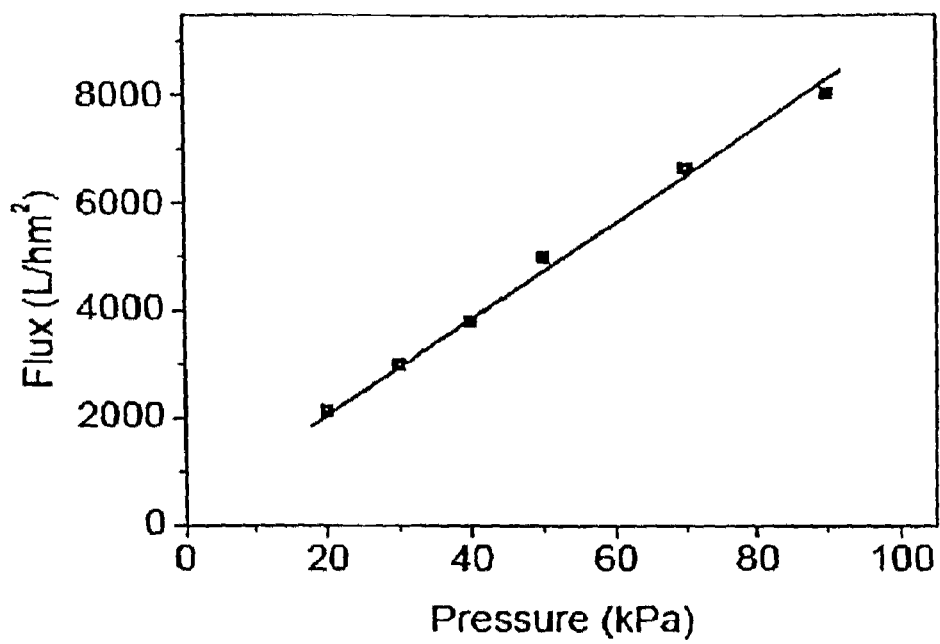
FIG. 3 is illustrative of the dependency-on-pressure of the permeation rate of water through a 60 nm thick ultrafilter membrane.

FIG. 3 shows the dependency-on-pressure of a water flux in the case where the ultrafilter membrane of RNo. 1-02 is used in combination with the supporting substrate of FNo. 2-01. Using a suction filter to which a porous substrate having the ultrafilter membrane placed thereon was attached, the water flux was measured at varied pressures. The water flux increased between 20 kPa and 90 kPa with an increasing pressure difference. With a pressure difference of 90 kPa, the water flux was found to be 8,100±50 L/hm². This relation indicates that the permeation of water through the ultrafilter membrane takes place according to the Hagen-Poiseuille equation.

Figure 4:
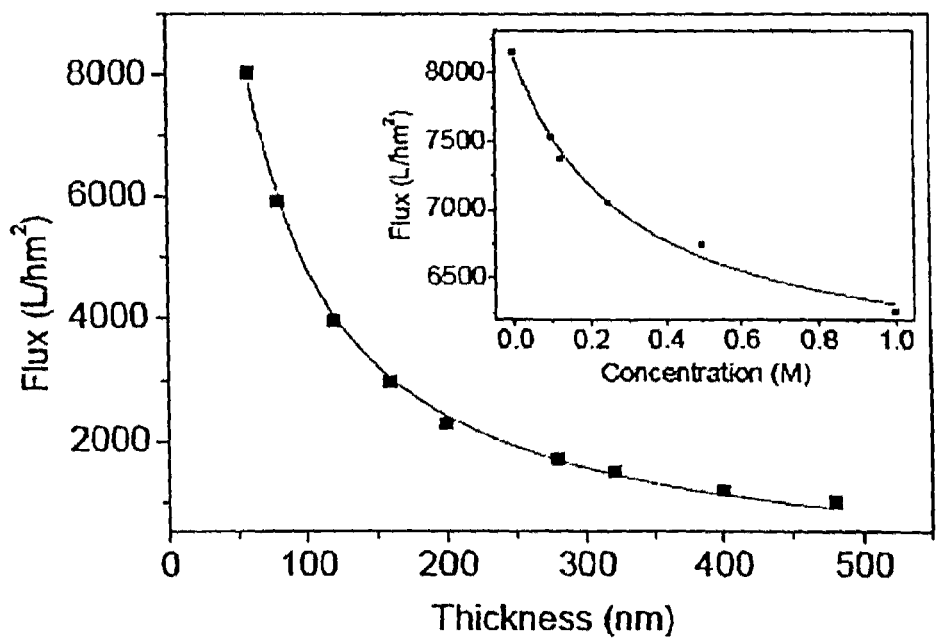
FIG. 4 is illustrative of the dependency-on-thickness) of the permeation rate of water through an ultra filter membrane (brine concentration vs. permeation rate relations).

Shown in TNo. 3-01 to TNo. 3-10 in Table 3 and FIG. 4 are the results of identification of the dependency-on-membrane thickness of the permeation rate of water in the cases where the ultrafilter membranes of RNos. 1-02, 1-03, 1-05, 1-06, 1-07, 1-08, 1-09, 1-10 and 1-11 were used in combination with the supporting substrate of FNo. 2-01 in Table 2. When the membrane thickness was varied from 60 nm to 480 nm with the pressure difference kept constant at 90 kPa, the water flux decreased inversely proportional to the thickness of the ultrafilter membrane pursuant to the Hagen-Poiseuille equation.

TABLE 3

| | | Permeation Aqueous Solution | | Flux (L/m²) | | | | | | |
|---|---|---|---|---|---|---|---|---|---|---|
| TNo. | FNo./RNo. | Contents | M | 20* | 30* | 40* | 50* | 70* | 90* | Ref. Fig. |
| 3-01 | 2-01/1-02 | None | — | 2,132 | 3,010 | 3,818 | 5,017 | 6,689 | 8,068 | FIG. 3 |
| 3-02 | 2-01/1-02 | None | — | — | — | — | — | — | 8,027 | FIG. 4 |
| 3-03 | 2-01/1-03 | None | — | — | — | — | — | — | 5,929 | FIG. 4 |
| 3-04 | 2-01/1-05 | None | — | — | — | — | — | — | 3,963 | FIG. 4 |
| 3-05 | 2-01/1-06 | None | — | — | — | — | — | — | 2,970 | FIG. 4 |
| 3-06 | 2-01/1-07 | None | — | — | — | — | — | — | 2,275 | FIG. 4 |
| 3-07 | 2-01/1-08 | None | — | — | — | — | — | — | 1,698 | FIG. 4 |
| 3-08 | 2-01/1-09 | None | — | — | — | — | — | — | 1,497 | FIG. 4 |
| 3-09 | 2-01/1-010 | None | — | — | — | — | — | — | 1,175 | FIG. 4 |
| 3-10 | 2-01/1-011 | None | — | — | — | — | — | — | 992 | FIG. 4 |
| 3-11 | 2-01/1-02 | NaCl | 0 | — | — | — | — | — | 8,152 | FIG. 4 |
| 3-12 | 2-01/1-02 | NaCl | 0.1 | — | — | — | — | — | 7,525 | FIG. 4 |
| 3-13 | 2-01/1-02 | NaCl | 0.125 | — | — | — | — | — | 7,381 | FIG. 4 |
| 3-14 | 2-01/1-02 | NaCl | 0.25 | — | — | — | — | — | 7,051 | FIG. 4 |
| 3-15 | 2-01/1-02 | NaCl | 0.5 | — | — | — | — | — | 6,747 | FIG. 4 |
| 3-16 | 2-01/1-02 | NaCl | 1.0 | — | — | — | — | — | 6,261 | FIG. 4 |
| 3-17 | 2-04/1-02 | Port. | $2 \times 10^{-6}$ | — | — | — | — | — | 5,400 | FIG. 5 |

Port: Protoporphyrin
Fno.: Filter No. in Table 2
M: Molar concentration of the contents in the permeation aqueous solution
RNo.: Filter No. in Table 1
*kPa Shown in FIG. 4 are flux changes (TNos. 3-11, 3-12, 3-13, 3-14, 3-15, 3-16) in the cases where brine permeated through a 60 nm thick ultrafilter membrane (a combination of FNo. 2-01 with RNo. 1-02) with a pressure difference of 90 kPa. When the concentration of salt was brought up to 1 mole (the molar concentration will hereinafter be indicated by M), the flux dropped down to 6,261 L/hm². The diameters of hydration of sodium ions and chlorine ions are known to be 0.72 nm and 0.66 nm, respectively. These ions pass through the ultrafilter membrane without being blocked by that membrane. The viscosity of water does not change even when salt is added to it at an about 1M concentration, as well known in the art. Thus, the decrease in the flux with an increasing salt concentration implies that the nano permeation pores through the ultrafilter membrane contract with an increasing ionic strength.

Figure 5:
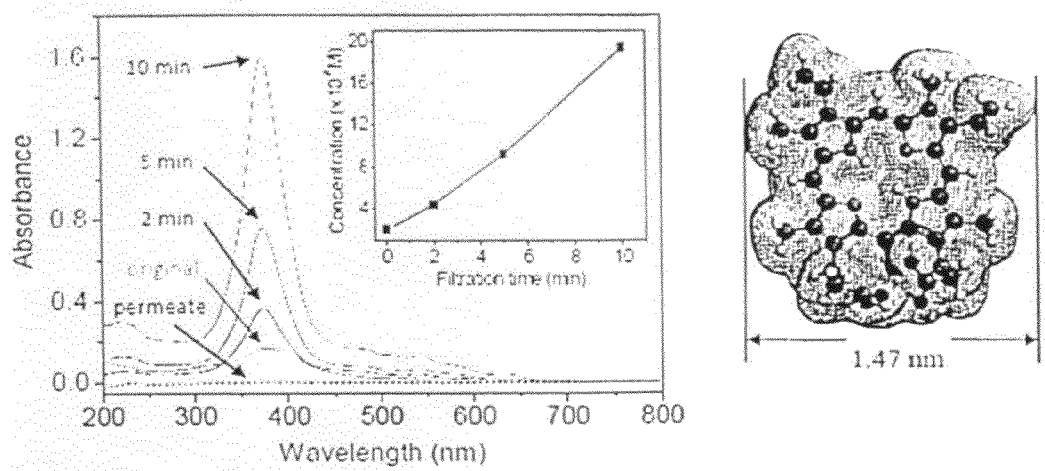
FIG. 5 is illustrative of ultraviolet and visible absorption spectral changes in association with the concentration of an aqueous solution of protoporphyrin (the presumed size of protoporphyrin is depicted in an electron cloud form).

FIG. 5 shows changes in the ultraviolet and visible absorption spectra of the feed in the case (TNo. 3-17 in Table 3) where a $2\times10^{-6}$ M protoporphyrin aqueous solution permeated through a 60 nm thick ultrafilter membrane. When there was a pressure difference of 90 kPa, 35 mL of 40 mL of the aqueous solution permeated in 10 minutes, and the amount of the feed decreased down to 5 mL. In the meantime, it was found that the absorption maximum intensity of the feed at 375 nm increased ninefold or tenfold. From such spectral changes, it has been found that the concentration of protoporphyrin on the feed side increases semi-linearly with filtration time. What relation the concentration of protoporphyrin on the feed side—calculated from the absorption maximum—has to the filtration time is also shown in Table 5.

As can be seen from the right side of FIG. 5, protoporphyrin has a molecular width of 1.5 nm. It is thus seen that the ultrafilter membrane allows for a passage of only molecules smaller than 1.5 nm. The filtration rate of the protoporphyrin aqueous solution was 5,400 L/hm².

Example 2

Figure 6:
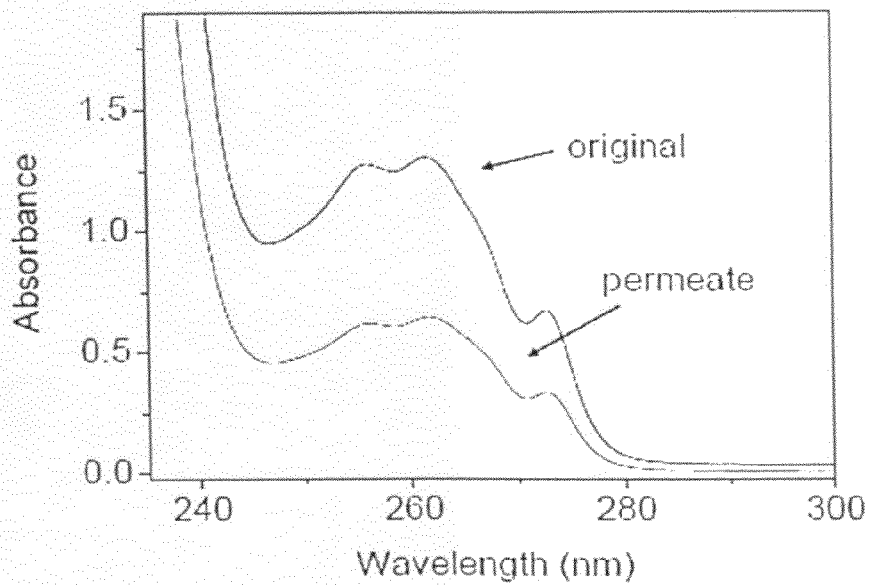
FIG. 6 is illustrative of ultraviolet and visible absorption spectra for a feed and filtrate upon filtration of γ-cyclodextrin derivative (the presumed size of γ-cyclodextrin derivative is depicted in an electron cloud form).
Figure 6:
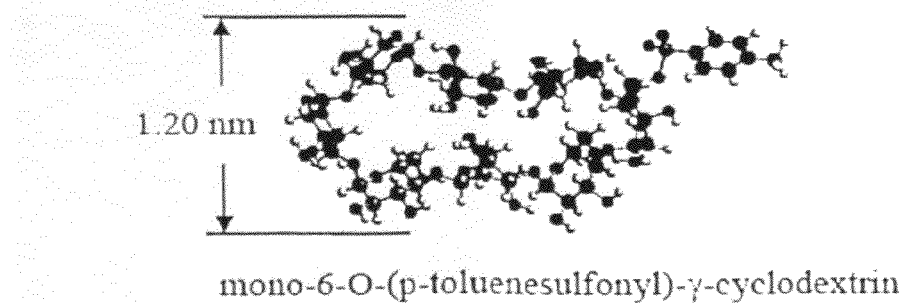

Filtration experimentation was conducted for cyclodextrin derivatives using the ultrafilter membrane in Table 2 (a combination of FNo. 2-01 with RNo. 1-02). The cyclodextrin derivatives used were mono-6-O-(p-toluenesulfonyl)-α-cyclodextrin (hereinafter called the α-derivative), mono-2-O-(p-toluenesulfonyl)-β-cyclodextrin (hereinafter called the β-derivative), and mono-6-O-(p-toluenesulfonyl)-γ-cyclodextrin (hereinafter called the γ-derivative). FIG. 6 shows the ultraviolet absorption spectra of a 1 mM aqueous solution of the γ derivative and an aqueous solution filtrated through a 60 nm thick ultrafilter membrane. The molecule size of the γ-derivative is 1.7 nm, larger than that of protoporphyrin in Example 1. However, the γ-derivative, because of having a more flexible molecular structure, can undergo changes in its molecular stereostructure, which allow it to have a width of 1.2 nm or less. How this takes place is shown in the lower portion of FIG. 6.

Table 4 shows the ability of the ultrafilter membrane to separate the cyclodextrin derivatives. The ultrafilter membrane used had a thickness of 60 nm, and filtration took place with a pressure difference of 90 kPa. The block rate for the α-derivative and β-derivative were 4% and 23%, respectively. The molecular sizes of these derivatives are 1.5 nm and 1.6 nm, respectively: that block rate remains small due to their flexible molecular structure. As an alcohol called 1-adamantanol was added to an aqueous solution of the β-derivative, on the other hand, it caused the block rate to increase from 23% to 85%. 1-Adamantanol is so included in the cyclic structure of the cyclodextrin that the cyclodextrin molecules can be kept from collapsing. In other words, the molecular size of the β-derivative would be greater than 1.5 nm in the aqueous solution in which there is 1-adamantanol. A similar phenomenon was observed with the γ-derivative too; that is, the block rate increased from 51% to 89% by the addition of 1-adamantanol.

Figure 7:
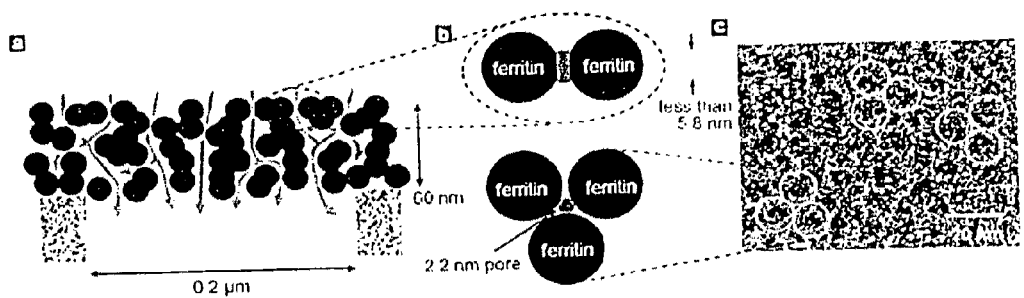
FIG. 7 is illustrative in schematic of the section of an ultrafilter membrane and the inter-protein "narrower path portion" (the TEM image of the filter membrane is given on the right side).

From the fact that the block rate for the γ-derivative is 51%, and for the reason that the width of this molecule may possibly become less than 1.2 nm, the width of the pores in the ultrafilter membrane was presumed to be 1.2 nm. However, there are possibilities that the surfaces of the molecules of the cyclodextrin derivatives or the inner walls of the pores may have been hydrated by water molecules. Suppose here that the layer of hydration had a thickness of 0.5 nm. The pore size will be 1.7 nm, and 2.2 nm at most. FIG. 7 is illustrative in section of the ultrafilter membrane, and in schematic of the "narrower path portion" between proteins. The narrow path having a pore diameter corresponding to a diameter of 2.2 nm at most (equivalent to a circle) is formed in an area surrounded with three ferritin molecules, and molecules wider than 1.5 nm are filtrated through that narrow path. On the right side of FIG. 7, there is a transmission electron microscope (TEM) image of the filter membrane given as data for verifying such a structure.

In the Hagen-Poiseuille equation, suppose that the pore radius was 1.1 nm and the surface porosity was 27%. A 60 nm thick membrane would be estimated to have an effective membrane thickness of 5.8 nm. Therefore, if the "narrower path portion" works as resistance to the permeation of water, its length would be considered 5.8 nm at most.

As shown in Table 4, the rate of permeation of the aqueous solution of the cyclodextrin derivatives is within the range of 6,100 L/hm² to 6,850 L/hm². With the β-derivative in particular, there is a flux of 6,660 L/hm² obtained although the saturated aqueous solution is used. This implies that the nano permeation pores are not clogged or jammed by the cyclodextrin derivatives. The molecular weights of the cyclodextrin derivatives are 1,127.1 for the α-derivative, 1,289.2 for the β-derivative, and 1,451.3 for the γ-derivative, figures much larger than the molecular weight (562.7) of protoporphylin in Example 1. It is thus evident that the ultrafilter membrane separates molecules based on their stereostructure, rather than their molecular weight.

TABLE 4

| TNo. | 4-01 | 4-02 | 4-03 | 4-04 | 4-05 |
|---|---|---|---|---|---|
| FNo./RNo. | 2-01/1-02 | 2-01/1-02 | 2-01/1-02 | 2-01/1-02 | 2-01/1-02 |
| | | Aqueous Solution to be Filtrated | | | |
| Contents | M6-Oα | M2-Oβ | M6-Oγ | M2-Oβ + AD | M6-Oγ + AD |
| MW | 1127.1 | 1289.2 | 1451.3 | 1289.2 + 152.3 | 1451.3 – 152.3 |
| Cf | ○ | ○ | ○ | X | X |
| mM | 1 | Saturated | 1 | 0.9 + 0.9 | 0.67 – 3.3 |
| Pressure Difference kPa | 90 | 90 | 90 | 90 | 90 |

TABLE 4-continued

| TNo. | 4-01 | 4-02 | 4-03 | 4-04 | 4-05 |
|---|---|---|---|---|---|
| Flux L/hm$^2$ | 6,850 | 6,660 | 6,580 | 6,250 | 6,100 |
| Block Rate % | 4 | 23 | 51 | 85 | 89 |
| Ref. Fig. | — | — | FIG. 6 | — | — |

FNo.: Filter No. in Table 1 (FNo.)
RNo.: Membrane Filter No. in Table 1 (RNo.)
MW (Molecular Weigth): Molecular weights of the contents
Cf: Whether or not there was a confrontational change (○: found, and X: not found)
mM: Millimolar concentration of the contents in the permeation aqueous solution
Block Rate: Amount of the cyclodextrin derivatives remaining after filtration/amount of the cyclodextrin derivatives in the feed
M6-Oα: Mono-6-O-(p-toluenesulfonyl)-α-cyclodextrin
M2-Oβ: Mono-2-O-(p-toluenesulfonyl)-β-cyclodextrin
M6-Oγ: Mono-6-O-(p-toluenesulfonyl)-γ-cyclodextrin
M2-Oβ + AD: Mono-2-O-(p-toluenesulfonyl)-β-cyclodextrin + 1-adamantanol
M6-Oγ + AD: Mono-6-O-(p-toluenesulfonyl)-γ-cyclodextrin + 1-adamantanol Example 3

Filtration experimentation was implemented for an aqueous solution of a sodium salt of polystyrenesulfonic acid using the ultrafilter membrane in Table 2 (combined FNo. 2-01/RNo. 1-02), as reported in Table 5. The aqueous solution used here was a polymer having a molecular weight of 70,000 and regulated to a concentration of 0.1 mg/mL (pH 6.7). Using a 60 nm thick ultrafilter membrane, the filtration experiment was carried out with a pressure difference of 90 kPa with the result that the block rate for that polymer was 2.9%. Although the molecular weight of this polymer is more than 120 times as high as that of protoporphyrin in Example 1, yet the block rate of the ultrafilter membrane is much more reduced. In other words, the elongate polymer can make its way through the "narrower path portion".

The sodium salt of polystyrenesulfonic acid permeates through the ultrafilter membrane at a flux of 1,540 L/hm$^2$, albeit having a high molecular weight. This rate is at least one-fourth of the filtration rate of the protoporphylin aqueous solution ($2\times10^{-6}$ M), at which the block rate of 100% is attained. In other words, the polymer having a molecular weight of 70,000 can pass fast through the "narrower path portion" depicted in FIG. 7. From this too, it is evident that the ultrafilter membrane separates molecules based on their stereostructure, rather than their molecular weight.

TABLE 5

| T No. | 5-01 |
|---|---|
| FNo./RNo. | 2-01/1-02 |
| Aqueous Solution to be filtrated | |
| Contents | Sodium polystyrenesulfonate |
| Molecular Weight | 70,000 |
| Cf | ○ |
| C | 0.1 |
| Pressure Difference kPa | 90 |
| Flux L/hm$^2$ | 1,540 |
| Block Rate % | 2.9 |
| Reference Figure | — |

FNo.: Filter No. in Table 2 (FNo.)
RNo.: Membrane Filter No. in Table 1 (RNo.)
Molecular Weight: Molecular weight of the contents
Cf: Whether or not there was a conformational change (○: found, and X: not found)
C: Concentration of the contents in the permeation aqueous solution (mg/mL)
Block Rate: Estimated from the concentration difference between the feed and the filtrate Comparative Example Table 6 shows the results of making estimation of the performance of commercial ultrafilter membranes as is the case with the estimation of the inventive ultrafilter membranes.

A cellulosic ultrafilter membrane (Millipore PLCC) having a fractionated molecular weight of 5,000 had a block rate of 53% for protoporphyrin, and the then flux was 9 L/hm$^2$. Although the block rate is not 100%, yet the flux is 600 times as small as that of the inventive ultrafilter membrane (of 60 nm in thickness).

An ultrafilter membrane (Millipore PLBC) having a fractionated molecular weight of 3,000 had a block rate of 84% for protoporphyrin, and the then flux was 4 L/hm$^2$. Again, although the block rate is not 100%, yet the flux is 1,300 times as small as that of the inventive ultrafilter membrane (of 60 nm in thickness).

Besides, an ultrafilter membrane (Millipore PLAC) having a fractionated molecular weight of 1,000 had a block rate of 100% for protoporphyrin, but the then flux was all too small to measure. This implies that the flux is at least 10,000 times as small as that of the inventive ultra filter membrane (of 60 nm in thickness).

It has consequently been verified that the inventive ultrafilter membranes capable of filtrating molecules of 1.5 nm or greater in width outweigh commercial membranes now on the market by a factor of 1,000 or greater.

TABLE 6

| | Conventional Filter | | | Filtration |
|---|---|---|---|---|
| TNo. | Ultrafilter Membrane | FMW | Flux L/hm$^2$ | Block Rate % | Experiment TNo. |
| 6-01 | Millipore PLCC | 5,000 | 9 | 53 | 3-17 |
| 6-02 | Millipore PLBC | 3,000 | 4 | 84 | 3-17 |
| 6-03 | Millipore PLAC | 1,000 | — | 100 | 3-17 |

FMW: Fractionated molecular weight
—: could not be measured
Block Rate: Estimated from the concentration difference between the feed and the filtrate

What is claimed is:

1. An organic polymers-separation membrane filter comprising:
   an ultrafilter membrane including a path having a nano permeation pore with a narrower portion having a width narrower than that of a rest of the nano permeation pore so that organic polymers capable of changing in a stereostructure pass through the path with the nano permeation pore while widths of the organic polymers are transformed into a configuration along the narrower portion, thereby separating the organic polymers,
   wherein the ultra-filter membrane has particulate materials formed of protein particles and mutually crosslinked and integrated together in thickness and planar directions thereof, and the nano permeation pore is defined by a gap between the particulate materials, and has a mark therein.

2. The organic polymers-separation membrane filter according to claim 1, wherein the narrower portion has 0.5 nm to 20 nm inclusive in width.

3. An organic polymers-separation method, comprising:
   preparing an organic polymers-separation membrane filter comprising an ultrafilter membrane including a path having a nano permeation pore with a narrower portion having a width narrower than that of a rest of the nano permeation pore, the ultra-filter membrane having particulate materials formed of protein particles and mutually crosslinked and integrated together in thickness and planar directions thereof, and
   separating organic polymers capable of changing in a stereostructure by passing through the path with the nano permeation pore while widths of the organic polymers are transformed into a configuration along the narrower portion.

4. The organic polymers-separation method according to claim 3, wherein the stereostructure of the organic polymers has a polymer chain having a width exceeding the width of the narrower portion so that the organic polymers pass through the path with the nano permeation pore while the width of the polymer chain is reduced by conformational changes down to less than the width of the narrower portion.

* * * * *